(12) United States Patent
Wardropper et al.

(10) Patent No.: US 11,041,477 B2
(45) Date of Patent: Jun. 22, 2021

(54) REINFORCING STRUCTURE FOR A WIND TURBINE BLADE

(71) Applicant: Vestas Wind Systems A/S, Aarhus N. (DK)

(72) Inventors: Steve Wardropper, New Milton (GB); Jonathan Smith, Burridge (GB); Andrew Hedges, Surbiton (GB); Stephen Randall, Cowes (GB)

(73) Assignee: Vestas Wind Systems A/S, Aarhus N. (DK)

( * ) Notice: Subject to any disclaimer, the term of this patent is extended or adjusted under 35 U.S.C. 154(b) by 389 days.

(21) Appl. No.: 15/570,491

(22) PCT Filed: Apr. 29, 2016

(86) PCT No.: PCT/DK2016/050111
§ 371 (c)(1),
(2) Date: Oct. 30, 2017

(87) PCT Pub. No.: WO2016/177375
PCT Pub. Date: Nov. 10, 2016

(65) Prior Publication Data
US 2018/0283349 A1   Oct. 4, 2018

(30) Foreign Application Priority Data

May 1, 2015   (GB) ..................... 1507519

(51) Int. Cl.
*B29C 70/34* (2006.01)
*F03D 1/06* (2006.01)
(Continued)

(52) U.S. Cl.
CPC ....... *F03D 1/0675* (2013.01); *B29D 99/0003* (2013.01); *B29D 99/0028* (2013.01);
(Continued)

(58) Field of Classification Search
CPC ........ B29C 70/30; B29C 70/44; B29C 70/543
See application file for complete search history.

(56) References Cited

U.S. PATENT DOCUMENTS

| 4,113,910 A * | 9/1978 | Loyd ..................... B29C 66/112 |
| | | 428/162 |
| 4,331,723 A * | 5/1982 | Hamm .................. B29C 70/865 |
| | | 428/61 |

(Continued)

FOREIGN PATENT DOCUMENTS

| CN | 101855052 A | 10/2010 |
| CN | 104245295 A | 12/2014 |

(Continued)

OTHER PUBLICATIONS

Intellectual Property Office, Combined Search and Examination Report in GB1507519.5, dated Oct. 29, 2015.
(Continued)

*Primary Examiner* — Matthew J Daniels
(74) *Attorney, Agent, or Firm* — Wood Herron & Evans LLP (57) ABSTRACT

A method of making an elongate reinforcing structure, such as a shear web, for a wind turbine blade is described. The reinforcing structure comprises a longitudinally-extending web and a longitudinally-extending flange. The flange extends along a longitudinal edge of the web and is arranged transversely to the web. The method involves providing a flange structure comprising a flange portion, and a projecting portion that extends along the length of the flange portion and projects transversely from a surface of the flange portion. The projecting portion is bonded between laminate layers of the web. The flange structure is preferably a pultruded component having a T-shaped cross-section. The method allows a simple, inexpensive and reconfigurable (Continued)

mould tool to be used. In preferred embodiments the mould tool has a flat surface without sidewalls.

21 Claims, 9 Drawing Sheets (51) Int. Cl.
  *B29D 99/00* (2010.01)
  *B29L 31/08* (2006.01)
  *B29K 63/00* (2006.01)
  *B29K 105/08* (2006.01)
(52) U.S. Cl.
  CPC .... *B29K 2063/00* (2013.01); *B29K 2105/089* (2013.01); *B29L 2031/085* (2013.01); *F05B 2240/30* (2013.01); *F05B 2280/6003* (2013.01); *Y02E 10/72* (2013.01); *Y02P 70/50* (2015.11)

(56) References Cited

U.S. PATENT DOCUMENTS

| | | | | |
|---|---|---|---|---|
| 4,633,632 A * | 1/1987 | Sarh | ........................ | B29C 53/70 52/245 |
| 4,734,146 A * | 3/1988 | Halcomb | .............. | B29C 69/003 156/148 |
| 4,980,013 A * | 12/1990 | Lowery | ................... | B29C 53/04 100/232 |
| 5,135,385 A * | 8/1992 | Fukuzawa | ........... | B29C 45/1751 425/450.1 |
| 5,538,589 A * | 7/1996 | Jensen | .................. | B29C 69/004 100/211 |
| 6,562,436 B2 * | 5/2003 | George | ..................... | B32B 5/12 428/105 |
| 6,849,150 B1 * | 2/2005 | Schmidt | ................ | B29C 65/483 156/285 |
| 7,270,722 B2 * | 9/2007 | Navas | ................... | B29C 70/345 156/212 |
| 7,464,508 B2 * | 12/2008 | Fournie | ................. | B29C 70/345 52/309.1 |
| 2009/0123708 A1 * | 5/2009 | Depase | ................. | B29C 70/342 428/178 |
| 2010/0024966 A1 * | 2/2010 | Felip | ..................... | B29C 53/265 156/196 |
| 2010/0080942 A1 * | 4/2010 | McCarville | ............... | B32B 1/02 428/34.1 |
| 2010/0181018 A1 * | 7/2010 | Walczyk | ................. | B29C 70/44 156/243 |
| 2011/0142679 A1 | 6/2011 | Bendel et al. | | |
| 2013/0334735 A1 * | 12/2013 | Casazza | ................ | B29C 70/443 264/258 |
| 2019/0329509 A1 * | 10/2019 | Coxon | .................. | B29C 70/462 |

FOREIGN PATENT DOCUMENTS

| | | |
|---|---|---|
| EP | 2368792 A2 | 9/2011 |
| WO | 0216197 A1 | 2/2002 |
| WO | 2011113812 A1 | 9/2011 |

OTHER PUBLICATIONS

European Patent Office, International Search Report and Written Opinion in PCT/DK2016/050111, dated Aug. 23, 2016.
China National Intellectual Property Administration, First Notification of Office Action in CN Application No. 201680034290.9, dated May 30, 2019.

* cited by examiner

REINFORCING STRUCTURE FOR A WIND TURBINE BLADE

TECHNICAL FIELD

The present invention relates to a reinforcing structure for a wind turbine blade and to a method of making a reinforcing structure.

BACKGROUND

Modern wind turbine blades typically comprise an outer shell of composite construction. The outer shell may be formed from a windward half shell and a leeward half shell bonded together, or alternatively the outer shell may be formed as a single moulding.

Figure 1:
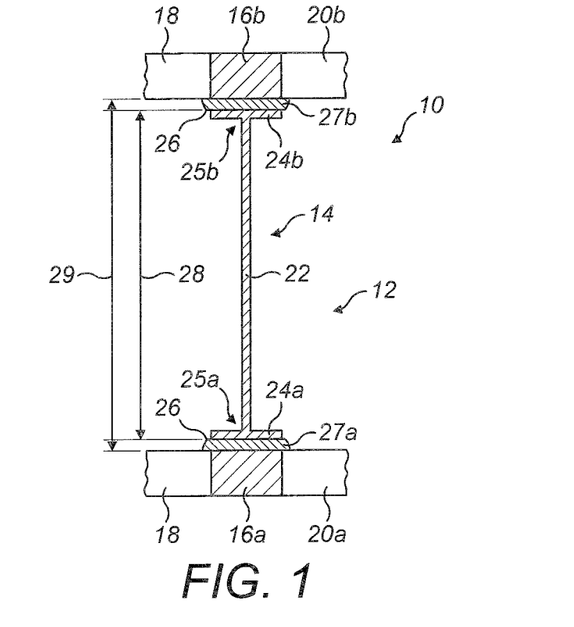

One or more load-bearing structures such as spars are typically located inside the blade. A known spar structure is shown schematically in FIG. 1, which is a transverse cross-section through part of a wind turbine blade 10. Referring to FIG. 1, this shows a spar structure 12 comprising a shear web 14 and a pair of spar caps 16a, 16b. The spar caps 16a, 16b are embedded in the outer shell 18 of the wind turbine blade 10. The spar caps 16a, 16b are arranged in opposed relation and are located respectively in windward and leeward sides 20a, 20b of the outer shell 18.

The spar caps 16a, 16b extend longitudinally along a majority of the length of the wind turbine blade 10. Each spar cap 16a, 16b in this example is formed from a stack of pultruded strips (not shown) of carbon-fibre reinforced plastic. The number of strips in the stack depends upon the required stiffness of the blade shell 18 in this region. For example, wind turbine blades designed for high wind classes may require more reinforcing carbon strips than blades designed for lower wind classes. Accordingly, the local thickness of the shell 18 may vary from one blade to another depending upon such requirements.

The shear web 14 is connected between the spar caps 16a, 16b and comprises a web 22 and first and second flanges 24a, 24b provided at respective first and second ends 25a, 25b of the web 22. As such, the shear web 14 is substantially I-shaped in cross section. The web 22 bridges the leeward and windward sides 20a, 20b of the blade shell 18. The flanges 24a, 24b are oriented transversely to the web 22, when viewed in cross-section as in FIG. 1, and provide a means of mounting the shear web 14 between the opposed spar caps 16a, 16b.

The flanges 24a, 24b are bonded to the spar caps 16a, 16b by means of adhesive 26. Once cured, the adhesive 26 forms 'bond lines' 27a, 27b between the flanges 24a, 24b and the spar caps 16a, 16b. These bond lines 27a, 27b are shown in cross-section in FIG. 1. The height 28 of the shear web 14 is slightly less than the separation 29 between the opposed spar caps 16a, 16b to provide room for the adhesive 26.

Figure 2:
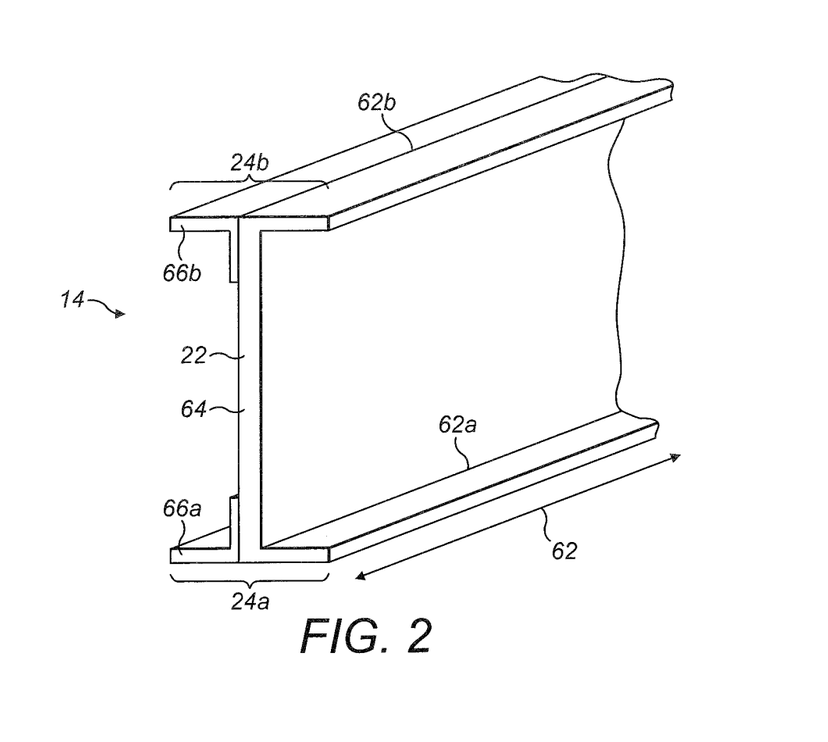

Referring now to FIG. 2, this shows a perspective view of an end region of the shear web 14 of FIG. 1. It can be seen in FIG. 2 that the shear web 14 extends longitudinally in the direction of the arrow 62. In practice the shear web 14 extends along the majority of the length of the wind turbine blade. It can also be seen in FIG. 2 that the first and second flanges 24a, 24b extend longitudinally along first and second longitudinal edges 62a, 62b of the web 22.

Referring still to FIG. 2, in this example the shear web 14 is formed of three sections: an elongate moulded panel 64, which is substantially C-shaped in cross-section, and first and second elongate return flanges 66a, 66b, which are substantially L-shaped in cross-section. The C-shaped panel 64 forms the web 22 of the shear web 14 and half of each flange 24a, 24b. The other half of each flange 24a, 24b is formed from the respective L-shaped return flanges 66a, 66b, which are bonded to the C-shaped panel 64 after its manufacture. The shear web 14 is constructed in this way as it is difficult to form an I-shaped structure using suitable moulding techniques.

The C-shaped panel 64 is of composite construction and has a laminate structure. The panel 64 is formed in a mould comprising a substantially flat elongate base with sidewalls extending longitudinally along the edges of the base, such that the mould is substantially C-shaped in cross section. During manufacture of the panel 64, a plurality of layers of glass-fibre fabric and core material are arranged in the mould. Resin is then admitted into the mould in a vacuum-assisted resin transfer moulding (VARTM) process. The resin infuses between the various structural layers, and once cured serves to integrate these layers together.

Manufacture of the C-shaped panel 64 is itself challenging. This is because the sidewalls of the C-shaped mould make it difficult to arrange the various structural layers in the mould in conformance with the mould surface. In particular there is a tendency for wrinkles to develop in the materials in the corners of the mould between the base of the mould and the sidewalls. Any wrinkles or other inaccuracies in the layup can lead to weaknesses in the moulded panel 64, which could render the part unusable.

The C-shaped mould tool used to form the shear web 14 is also relatively expensive. It is therefore prohibitive in terms of cost to vary the design of the shear web 14 from one blade to another to accommodate variations in the blade design such as to accommodate the varying shell thicknesses employed in high and low wind class blade designs. The shear web 14 must therefore accommodate a variety of shell thicknesses, and hence is sized to accommodate the thickest shells with additional adhesive 26 being employed in the bond lines 27a, 27b of thinner shell designs. However, adhesive is expensive and adds significantly to the weight of the blade and hence the current solution is not necessarily optimal.

The moulding process used to form the C-shaped panel 64 results in rough edges, which must be trimmed subsequently to allow safe handling of the panel 64. This process is time consuming and adds cost to the manufacturing process. Bonding of the L-shaped return flanges 66a, 66b to the C-shaped panel 64 is also time-consuming and adds further cost and complexity to the process.

Against this background, it is an object of the present invention to provide an improved reinforcing structure, such as a shear web, and an associated improved method of manufacturing the reinforcing structure, which addresses one or more of the above shortcomings.

SUMMARY OF THE INVENTION

According to a first aspect, the present invention provides a method of making an elongate reinforcing structure for a wind turbine blade. The reinforcing structure comprises a longitudinally-extending web and a longitudinally-extending flange. The flange extends along a longitudinal edge of the web and is arranged transversely to the web, and the method comprises:

providing a longitudinally-extending mould tool having a mould surface bound by a first longitudinal edge of the mould tool, the mould surface being shaped to define the web of the reinforcing structure;

providing a flange structure comprising a flange portion and a projecting portion that extends along the length of the flange portion and projects transversely from a surface of the flange portion;

supporting one or more first laminate layers of the web on the mould surface;

positioning the flange structure adjacent to the first longitudinal edge of the mould tool such that the projecting portion of the flange structure overlies a first longitudinal edge region of the one or more laminate layers and such that the flange portion is transverse to the mould surface;

arranging one or more second laminate layers on top of the one or more first laminate layers such that the one or more second laminate layers at least partially cover the projecting portion of the flange structure; and integrating the one or more first laminate layers, the one or more second laminate layers and the projecting portion of the flange structure in the mould by means of a matrix material and thereby bonding the projecting portion between the one or more first laminate layers and the one or more second laminate layers.

As discussed below, the present invention has many advantages over the prior art discussed by way of background.

The use of a preformed flange structure to form the flange allows a relatively simple and cheap mould tool to be used because the mould tool is not required to have a complex shape to form the flanges of the reinforcing structure. For example, and in contrast to the prior art, the mould surface is not required to have side walls and instead the mould tool may have a substantially flat mould surface. This provides a particularly inexpensive tooling solution and facilitates the layup process as it is relatively easy to position the laminate layers on the mould surface. The present invention also provides more consistent results and less wastage of parts because it avoids the complications associated with mould surfaces having steeply inclined side walls.

A particular advantage of the present invention is that it requires significantly fewer process steps than the prior art. In particular, once the reinforcing structure is removed from the mould, the process is substantially complete and no further process steps are necessary. This is in sharp contrast to the prior art, which requires the additional process steps of bonding return flanges and trimming the edges of the moulded component to allow for safe handling. In the present invention, the edges of the reinforcing structure may be defined by edges of the flange structures, which may conveniently already be safe for handling. The present invention also reduces the factory footprint of the manufacturing process since there is no requirement for additional processing stations for bonding and trimming, for example.

In preferred embodiments of the invention, the flange structure has a substantially constant cross section along its length. This facilitates the layup process and stock control since a single design of flange structure may be used along the entire length of the reinforcing structure.

In particularly preferred embodiments, the flange structure is a pultruded component. This is advantageous because pultruded components are relatively cheap. They also have smooth edges and hence ensure that the edges of the reinforcing structure can be handled safely immediately upon removal from the mould. Pultruded components can also be manufactured easily to a required length or cut to a required length. The pultrusion process used to form the flange structure may involve drawing bundles of loose fibres and/or fibres in the form of tapes through a pultrusion die.

The flange structure is preferably substantially T-shaped in cross-section. This shape is easy to form by pultrusion. Alternatively, the flange structure could have any suitable shape. For example it may be L-shaped in cross-section. The flange structure may be a single element that extends along substantially the entire length of the reinforcing structure, or alternatively a plurality of flange structures may be arranged in series along the length of the reinforcing structure.

In certain embodiments the flange portion may be in the form of a substantially flat strip. In some embodiments described in detail later, the flange portion is wedge-shaped. The flange portion may have a V-shaped or curved outer surface. The projecting portion may form an angle of approximately 90 degrees (e.g. 90 degrees+/−a few degrees) with an inner surface of the flange portion. The flange portion may advantageously have a substantially flat inner surface from which the projecting portion projects.

The present invention allows reinforcing structures of varying height to be formed by making simple adjustments to the mould apparatus.

One way of reconfiguring the mould involves arranging a packing element adjacent to the first longitudinal edge of the mould tool, between the mould tool and the flange portion of the flange structure. The packing element has an upper surface defining an extension of the mould surface. The one or more first laminate layers, the projecting portion of the flange structure and the one or more second laminate layers are arranged such that they at least partially overlie the upper surface of the packing element. The dimensions of the packing element are selected according to the required height of the reinforcing structure.

Another way of reconfiguring the mould tool is by means of depth stops. Accordingly, the mould tool may comprise one or more depth stops provided at the first longitudinal edge of the mould tool. The or each depth stop may be arranged to extend beyond the mould surface and abut the flange portion of the flange structure to set the extent to which the projecting portion of the flange structure can extend between the one or more first laminate layers and the one or more second laminate layers. This therefore conveniently serves to set the height of the reinforcing structure. Preferably the or each depth stop is adjustable and the method comprises varying the extent to which the depth stop extends beyond the mould surface thereby to select the required height of the reinforcing structure.

The reconfigurable tooling allows reinforcing structures of varying dimensions to be formed so that the structures can be tailored for use in a particular blade. For example, in preferred embodiments of the invention, the reinforcing structure is a shear web, and the invention allows taller shear webs to be formed to accommodate relatively thin shells such as those used in blades designed for low wind classes, or shorter shear webs to be formed to accommodate relatively thick shells, such as those used in blades designed for high wind classes. Whereas the prior art relied on varying the amount of adhesive to accommodate such changes in shell thickness, the flexible tooling of the present invention allows optimal bond lines to be formed for any given blade, since there is now the option to form shear webs of any particular height without having to replace or make expensive modifications to the tooling.

In certain embodiments, at least part of the mould surface comprises a kink. This results in the web portion of the reinforcing structure having a kink. A kinked reinforcing structure is desirable in some cases, for example to ensure that the flanges of the shear web lie flat against the spar caps to which they are bonded in curved sections of the blade shell. In accordance with particular embodiments of the invention, the kink may be formed using a kinked mould surface, or by positioning a suitably-shaped element on a substantially flat mould surface.

The one or more first laminate layers and/or the one or more second laminate layers preferably comprise fibrous material, such as carbon or glass fibre fabric. In preferred embodiments of the invention, the fibrous fabric is pre-impregnated with a matrix material such as epoxy resin; such material is commonly referred to as 'prepreg'. Prepreg has a tacky surface which, in the present invention, conveniently serves to retain the flange structure in the correct position when it is positioned on top of the prepreg layer(s). In other examples, dry fibrous fabric such as dry glass-fibre fabric may be used to form the laminate layers.

The method may comprise arranging core material between the one or more first laminate layers and the one or more second laminate layers. The core material may be any suitable material, for example foam, polystyrene or balsa.

The method may further comprise integrating the various component parts of the reinforcing structure together using a vacuum process. For example, the method may comprise arranging a vacuum film over the mould tool to form a sealed region encapsulating the laminate layers and the projecting portion of the flange structure. The sealed region is then evacuated, which causes the vacuum film to apply pressure to the layup. If prepreg materials are used, this serves to consolidate the layers. If dry materials are used, a suitable matrix material may additionally be admitted into the sealed region by means of an infusion process. The matrix material is preferably a thermosetting resin, such as epoxy. Other suitable resins will be readily apparent to persons skilled in the art. In both cases, heat may be applied to cure the resin.

The method may comprise arranging the vacuum film over the flange portions of the reinforcing flange structures such that substantially the entire flange structure is encapsulated within the sealed region. Alternatively, the vacuum film may cover only part of the flange portions or may stop short of the flange portions. For example, in a particular embodiment described later, the vacuum bag stops short of the flange portions and is sealed against the projecting portion of the flange structure.

The reinforcing structure preferably includes a flange along both of its longitudinal edges. To this end, the method may comprise providing a further flange structure comprising a flange portion and a projecting portion that extends along the length of the flange portion and projects transversely from a surface of the flange portion; positioning the further flange structure adjacent to a second longitudinal edge of the mould tool such that the projecting portion of the further flange structure overlies a second longitudinal edge region of the one or more laminate layers and such that the flange portion is transverse to the mould surface; arranging the one or more second laminate layers on top of the one or more first laminate layers such that the one or more second laminate layers additionally at least partially cover the projecting portion of the further flange structure; and bonding the projecting portion of the further flange structure between the one or more first laminate layers and the one or more second laminate layers.

The respective flange structures are preferably substantially identical. In preferred embodiments, both flange structures are T-shaped pultrusions, and these pultrusions may be formed using the same pultrusion die.

The invention also provides an elongate reinforcing structure for a wind turbine blade, the reinforcing structure comprising: a longitudinally-extending web of composite construction and formed of a plurality of laminate layers; and a first longitudinally-extending flange extending along a first longitudinal edge of the web and arranged transversely to the web, wherein the first flange comprises a projecting portion that projects transversely to the flange and which is integrated between laminate layers of the web portion.

The elongate reinforcing structure preferably includes a second longitudinally-extending flange extending along a second longitudinal edge of the web and arranged transversely to the web. The second flange may comprise a projecting portion that projects transversely to the second flange and which is integrated between laminate layers of the web portion.

The elongate reinforcing structure is preferably a shear web. The invention includes a wind turbine blade comprising a shear web as described above or made according to the method described above, and a wind turbine comprising the wind turbine blade.

BRIEF DESCRIPTION OF THE DRAWINGS

FIGS. 1 and 2 have already been described above by way of background to the present invention. In order that the present invention may be more readily understood, the invention will now be described by way of example with reference to the following figures, in which:

DETAILED DESCRIPTION

Figure 3:
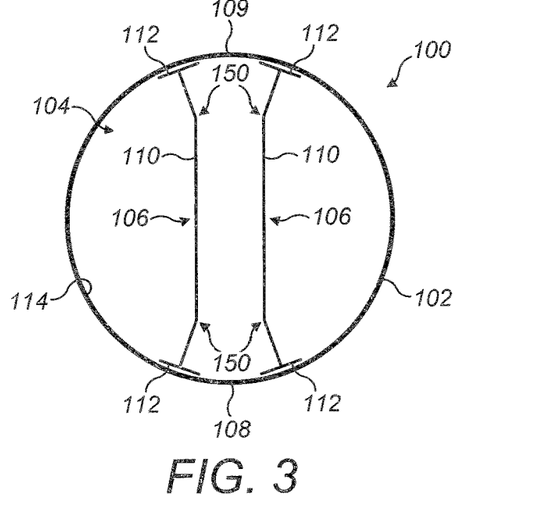
FIG. 3 is a schematic cross-section through a circular root end of a wind turbine blade, showing a pair of shear webs according to the present invention.

Referring to FIG. 3, this shows a schematic cross-section through a circular root end of a wind turbine blade 100. The blade comprises an outer shell 102 defining a substantially hollow interior 104. A pair of shear webs 106 according to the present invention extend longitudinally inside the blade 100, perpendicular to the plane of the page, and are connected between windward and leeward sides 108, 109 of the blade shell 102.

The shear webs 106 include a web portion 110 having flanges 112 at each end. The web portion 110 is kinked to accommodate the high degree of curvature at the root end of the blade 100. This allows the flanges 112 of the shear webs 106 to be arranged flush with an inner surface 114 of the blade shell 102 whilst an intermediate section of the web portion 110 extends substantially vertically, in the orientation of the blade 100 shown in FIG. 3.

As will be readily apparent to persons skilled in the art, the profile of the wind turbine blade 100 varies along its length. Moving from the root end of the blade 100 towards the tip of the blade 100, the profile transitions into an airfoil profile, which tends to flatten out progressively moving towards the tip. In such flatter regions of the blade 100, the shear webs 106 do not necessarily include a kink, and may more closely resemble the shear web shown in FIG. 1.

FIGS. 4a to 4d show a series of steps involved in the manufacture of a shear web 106 in accordance with a first embodiment of the present invention. The shear web 106 is a composite component having a laminate structure and is formed using a relatively low-cost mould tool.

Figure 4A:
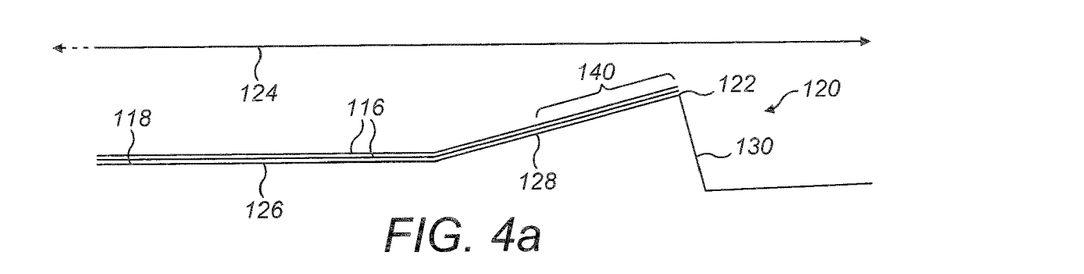
FIGS. 4a-4d illustrates a method of manufacturing a shear web in accordance with a first example of the present invention.

Referring initially to FIG. 4a, this shows a plurality of first layers 116 of glass fibre fabric pre-impregnated with a resin (so-called 'prepreg'), which are arranged on a surface 118 of a mould tool 120. The prepreg has a tacky surface, due to the pre-impregnated resin being in an uncured or partially cured state. The mould tool 120 comprises a steel plate, which defines the mould surface 118. In contrast to the prior art C-shaped mould tool referred to by way of background, the mould tool 120 of the present invention does not include any side walls and hence the layup process is simplified and does not suffer from the disadvantages associated with the prior art discussed by way of background.

The mould tool 120 is shown in cross-section in FIGS. 4a-4d, and in practice the mould tool 120 extends significantly in a longitudinal direction substantially perpendicular to the plane of the page. The mould surface 118 therefore also extends in the longitudinal direction. The mould surface 118 is bound by first and second longitudinal edges 122 of the mould tool 120 in a width-wise direction 124, which is generally perpendicular to the longitudinal direction. Only the first longitudinal edge 122 of the mould tool 120 is shown in FIGS. 4a-4d.

The shape of the mould surface 118 may vary along its length according to the required shape of the shear web 106 depending upon the local profile of the blade 100 to which the shear web 106 is to be attached. The section of the mould tool 120 shown in FIGS. 4a-4d includes a first portion 126 that is generally horizontal and a second portion 128 that is inclined relative to the horizontal. In other words, the mould surface 118 includes a kink 119. The kinked mould surface 118 results in a shear web 106 having a kink to accommodate a curved shell profile, such as at the root end of the blade (as discussed above with reference to FIG. 3). The relative angles of the first and second portions 126, 128 of the mould surface 118 may vary along the length of the tool 120 depending upon the required local shape of the shear web 106, and sections of the mould surface 118 may be entirely horizontal in certain regions where the shear web 106 does not require a kink.

The mould tool 120 includes a shoulder portion 130 adjacent to the first longitudinal edge 122. The mould tool 120 may optionally also include a further shoulder portion adjacent its second longitudinal edge (not shown).

Figure 4B:
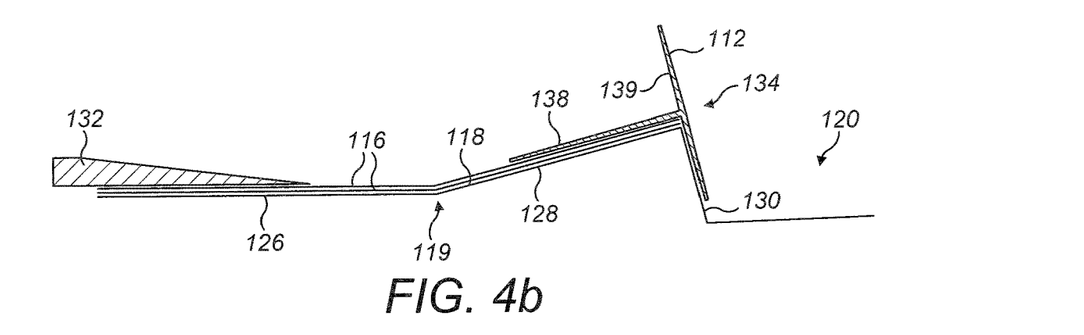

Referring now to FIG. 4b, a core layer 132 is positioned on top of the glass fabric. The core layer 132 in this example is formed of polyurethane foam. The core layer 132 is wedge shaped in cross section and overlies part of the prepreg layers 116 on the horizontal section 126 of the mould surface 118. The exact size, shape and position of the core material 132 depends upon the design and structural requirements of the shear web 106. Core material 132 is positioned in locations where the shear web 106 is required to have increased stiffness, and results in these regions having a sandwich panel structure.

Referring still to FIG. 4b, this shows a flange structure 134 positioned adjacent to the first longitudinal edge 122 of the mould tool 120. The flange structure 134 comprises a flange portion 112 in the form of a substantially flat strip, which extends in the longitudinal direction, perpendicular to the plane of the page. The flange structure 134 also includes a projecting portion 138 (also referred to as an 'upstand') that extends along the length of the flange portion 112 and projects perpendicularly from a surface 139 of the flange portion 112. Accordingly, the flange structure 134 is substantially T-shaped in cross-section.

The flange structure 134 is of composite construction, and comprises a plurality of unidirectional glass reinforcing fibres embedded in a cured resin matrix. The flange structure 134 is formed by pultrusion, which involves coating the unidirectional fibres in resin before drawing them through a T-shaped pultrusion die. Accordingly, the cross-sectional shape of the flange structure 134 is substantially constant along its length.

The flange structure 134 is positioned such that the projecting portion 138 overlies a first longitudinal edge region 140 (indicated in FIG. 4a) of the one or more prepreg laminate layers 116. The tack of the prepreg serves to retain the flange structure 112 in the correct position. With the projecting portion 138 overlying the prepreg layers 116, the flange portion 112 is transverse to the mould surface 118, and in this example is substantially perpendicular to the second portion 128 of the mould surface 118. The flange 112 abuts, and lies flush with, the shoulder portion 130 of the mould tool 120.

Figure 4C:
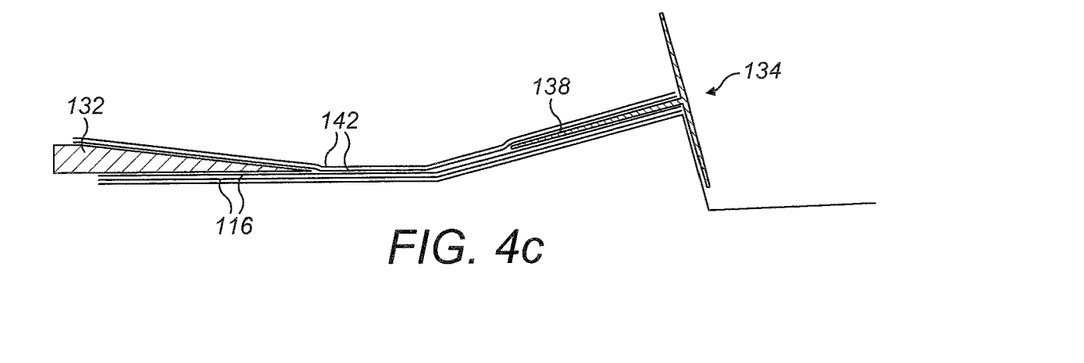

Referring now to FIG. 4c, a plurality of second layers 142 of prepreg glass fibre fabric are arranged on top of the one or more first layers 116 such that the one or more second layers 142 at least partially cover the core layer 132 and the projecting portion 138 of the flange structure 134. This completes the laminate layup of the shear web 106.

Figure 4D:
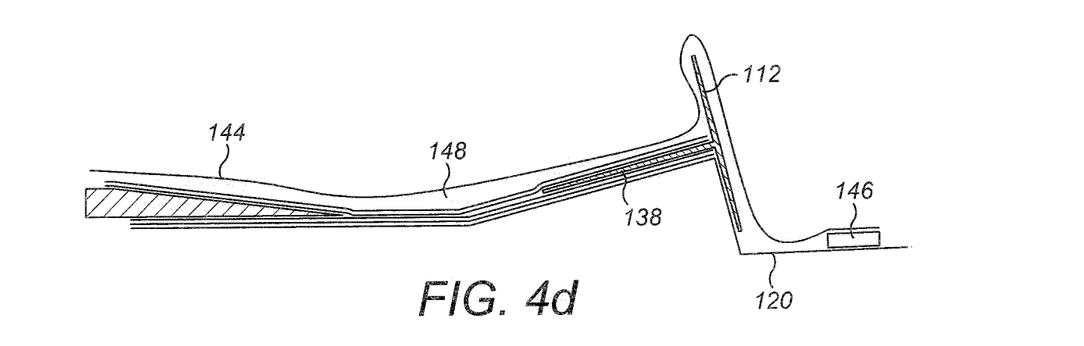

Referring now to FIG. 4d, the layup is then covered with a vacuum film 144 and sealed against the mould tool 120 using sealing tape 146 to define a sealed region 148 encapsulating the layup. Air is removed from the sealed region 148 using a vacuum pump (not shown). This causes the vacuum film 144 to bear against the layup and consolidate the various layers. Heat is also applied to the layup causing the resin in the prepreg laminate layers to permeate between the various layers and components before curing, i.e. hardening, and thereby integrating the various laminate layers together to form the shear web. Whilst not shown in the figures, one or more layers of transfer mesh may be provided between the layup and the vacuum film 144 to enhance resin permeation. Other consumable materials such as release layers may also be employed in the mould as would be readily apparent to persons skilled in the art.

Once the resin has cured, the vacuum film 144 is removed and the completed shear web 106 can be removed from the mould 120. In the completed shear web 106, the projecting portion 138 of the flange structure 134 is bonded between the first and second laminate layers 116, 142, and thereby the flange 112 is integrated with the web 110 during the moulding process.

Whilst not shown in the figures, the shear web 106 preferably includes a second flange extending along the second longitudinal edge of the shear web (not shown). This flange is preferably also integrated with the web during the moulding process. Therefore a second flange structure substantially identical to the pultruded flange structure 134 described above is arranged along the second edge of the mould tool 120 with its projecting portion sandwiched between the first and second laminate layers 116, 142 during the layup process, in the same way as described above. The mould surface 118 may include a further kink towards the second longitudinal edge to form a further kink in the shear web 106 near the second flange.

Referring again to FIG. 3, the moulded shear webs 106 include kinks 150 resulting from the kinks 119 (indicated in FIG. 4b) in the mould surface 118 as mentioned above. It will be appreciated that the inner surface 114 of the blade shell 102, to which the flanges 112 of the shear web 106 are bonded, is curved. The kinks 150 in the shear webs 106 allow the shear webs 106 to accommodate this curvature as discussed above.

An optional step in the manufacturing process will now be described with reference to FIGS. 4e and 4f, which show the use of packing elements 152a, 152b as extensions of the mould tool 120 to set the height of the shear web 106 to be manufactured.

Figure 4E:
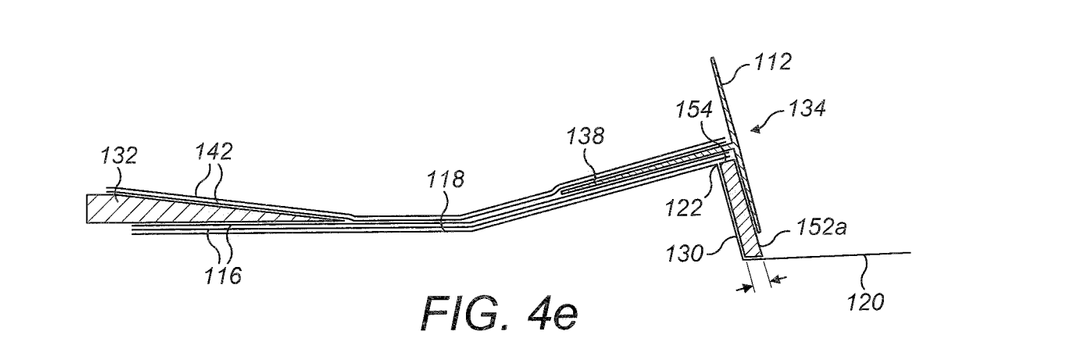
FIGS. 4e and 4f illustrate the use of packing elements of varying dimensions for making shear webs of varying height.

Referring to FIG. 4e, this shows a packing element 152a positioned adjacent to the shoulder 130 of the mould tool 120. An upper surface 154 of the packing element 152a is substantially flat and forms a continuation of the mould surface 118 alongside the first longitudinal edge 122 of the mould tool 120. The packing element 152a is elongate and has a generally rectangular cross section. In this example the packing element 152a extends along substantially the entire length of the mould surface 118. In other embodiments, a series of packing elements could be used.

As shown in FIG. 4e, with the packing element 152a in place, the materials 116, 132, 134, 142 are arranged in the mould 120 such that the first laminate layers 116, the projecting portion 138 of the flange structure 134 and the second laminate layers 142 overlie the upper surface 154 of the packing element 152a. The flange 112 of the flange structure 134 abuts the packing element 152a, such that the packing element 152a is located between the shoulder 130 of the mould tool 120 and the flange 112. The layup is then covered with a vacuum film and subject to a vacuum consolidation and cure process in the same way as described previously with reference to FIGS. 4a-4d to form the shear web 106. The completed shear web 106 is then removed from the mould 120 and the packing element 152a can be re-used in subsequent moulding operations to form further shear webs 106.

Figure 4F:
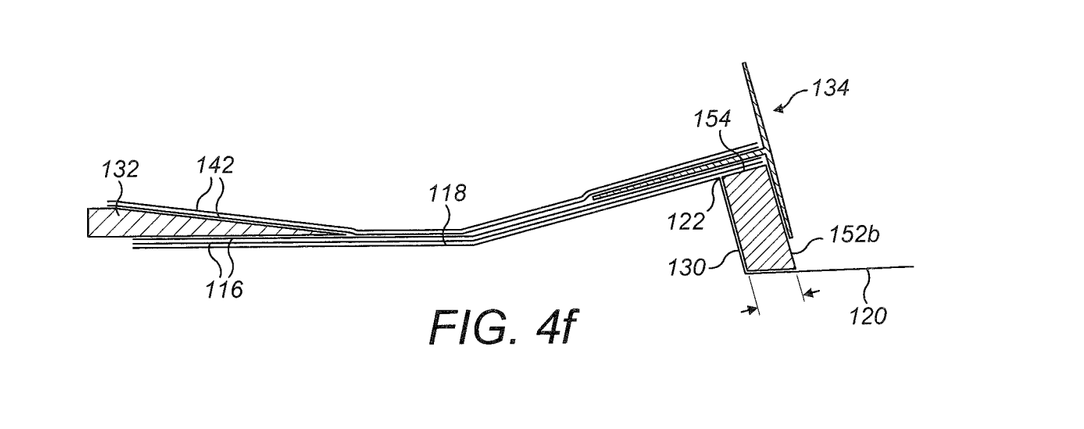

Referring now to FIG. 4f, this shows the use of a wider packing element 152b. The wider packing element 152b has a wider upper surface 154 and hence further extends the mould surface 118 alongside the first longitudinal edge 122 of the mould tool 120. Whilst not shown in the figures, a similar packing element can be used adjacent the second longitudinal edge of the mould (not shown) if required.

The dimensions of the packing elements 152a, 152b are selected according to the required height of the shear web 106. This allows the mould 120 to be readily adjusted to accommodate design variations. For example, taller or shorter shear webs can be made using the same mould tool simply by varying the thickness of the packing element(s). The mould tool can therefore be readily adjusted to make a relatively taller shear web, for example to accommodate thinner shells for lower wind class blades, or to make a relatively shorter shear web, for example to accommodate thicker shells employed in higher wind class blades. This therefore allows the thickness of the bond lines to be selected independently of the height of the shear web, which provides greater control and optimisation of the overall blade manufacturing process. It also avoids the need for additional adhesive when thinner shells are produced, resulting in a lighter and cheaper blade.

An alternative method of manufacturing a shear web 106 will now be described with reference to FIGS. 5a to 5d.

Figure 5A:
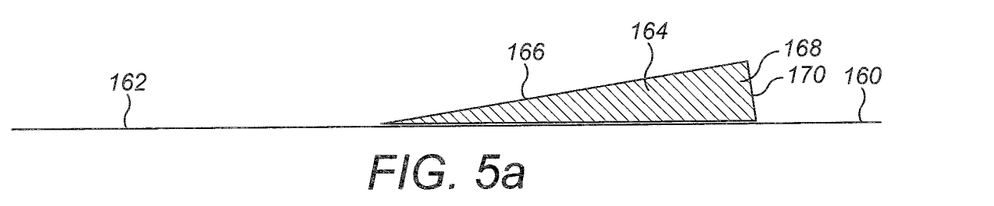
FIGS. 5a to 5d illustrate a shear web and its method of manufacture in accordance with a second example of the present invention.

Referring to FIG. 5a, this shows a mould tool 160 having a flat surface 162. As with the previous embodiment, the mould tool 160 does not have side walls. The mould tool 160 is made from steel, and the flat surface 162 without side walls means that the mould tool 160 is a very inexpensive tooling solution. In order to form a kinked shear web, a wedge 164 is provided on top of part of the flat mould surface 162. The wedge 164 is a solid block, which may be made from any suitable material for example wood, metal, plastic or composites. The wedge 164 has an upper surface 166 that is inclined relative to the horizontal mould surface 162, and this upper surface 166 forms an effective mould surface on which part of the shear web layup is arranged.

The wedge 164 is preferably attached to the mould surface 162, for example using suitable fixings or more preferably it is bonded to the mould surface 162 by means of adhesive. The wedge 164 may extend along the entire length of the mould surface 162 or along part of the mould surface 162 depending upon the required shape of the shear web to be formed. A series of wedges 164 could also be used. The use of a wedge 164 provides an alternative to using a kinked-mould tool and advantageously allows a flat mould tool to be used, resulting in an exceptionally low-cost mould solution. A side 168 of the wedge 164 also conveniently forms a shoulder 170, which is functionally equivalent to the shoulder 130 of the mould tool 120 shown in FIGS. 4a-4f, as discussed above.

Figure 5B:
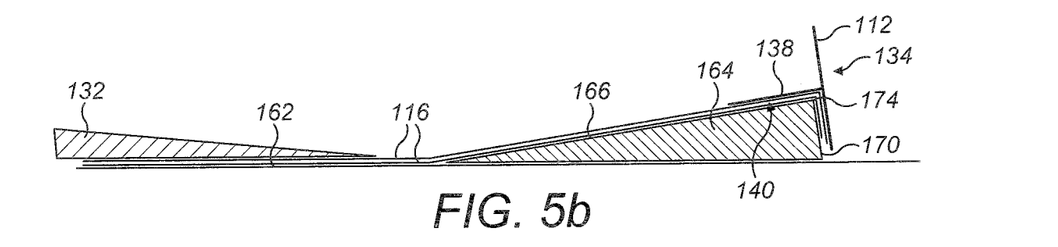

Referring now to FIG. 5b, a plurality of first layers 116 of prepreg glass fibre fabric are arranged on the mould surface 162. The layers 116 extend over the upper surface 166 of the wedge 164. In this example, the layers 116 are also draped over the shoulder 170 of the wedge 164. This provides the advantage of additionally reinforcing the flange 112. However, in other embodiments the layers 172 may be laid up to the edge 174 of the wedge 164, similar to the previous embodiment shown in FIGS. 4a-4f. Equally, variants of the embodiments shown in FIGS. 4a-4f can include the layers 116 draped over the shoulder 130/packing elements 152a, 152b.

Referring still to FIG. 5b, once the prepreg layers 116 have been arranged, core material 132 is arranged on top of these layers 116, where required, and a flange structure 134 identical to the flange structure described in relation to the previous embodiment is arranged such that its projecting portion 138 overlies a longitudinal edge region 140 of the prepreg layers 116 supported on the wedge 164. The flange 112 of the flange structure 134 lies substantially flush with the shoulder 170 of the wedge 164 with the draped portions of the prepreg layers 116 in-between.

Figure 5C:
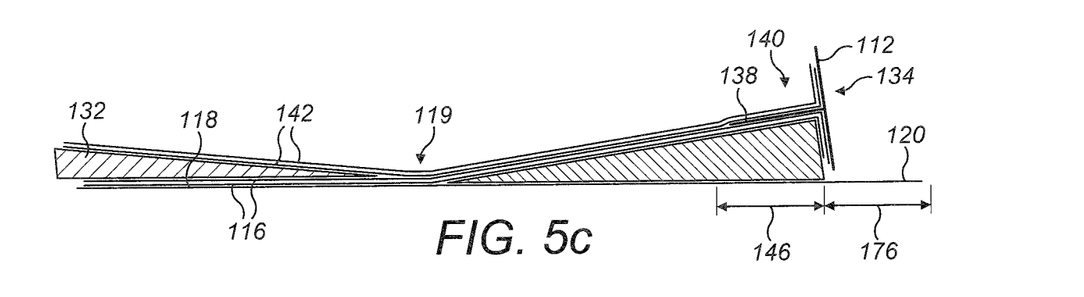

Referring now to FIG. 5c, a plurality of second layers 142 of prepreg glass fibre fabric are then arranged on top of the first layers 116 such that they cover the core material 132 and the projecting portion 138 of the flange structure 134. In this example, the second layers 142 are turned up in the first longitudinal edge region 140 such that they overlie the flange 112. This advantageously serves to reinforce the flange 112, as described above with regard to the draped portions of the first layers 116. In other embodiments, the second layers 142 may be laid up to the flange 112, similar to the previous embodiment shown in FIGS. 4a-4f. Equally, variants of the embodiments shown in FIGS. 4a-4f can include second layers 142 that are turned up so that they overlie the flange 112.

Referring still to FIG. 5c, this includes a pair of arrows 176, which show that the position of the wedge 164 in relation to the mould surface 118 can be selected to set the required height of the shear web 106. This allows the mould arrangement to be reconfigured easily to manufacture shear webs 106 of varying height to accommodate varying thicknesses of blade shell and/or to control the bond line thickness between the shear webs and the blade shell, as described previously. In practice the position of the wedge 164 is set prior to arranging the materials on top. Moving the wedge 164 in the direction of the arrows will of course alter the position of the kink 119. Alternatively, a wedge 164 having smaller or larger dimensions in the direction of these arrows 176 could be used if the position of the kink 119 is required to remain the same.

Figure 5D:
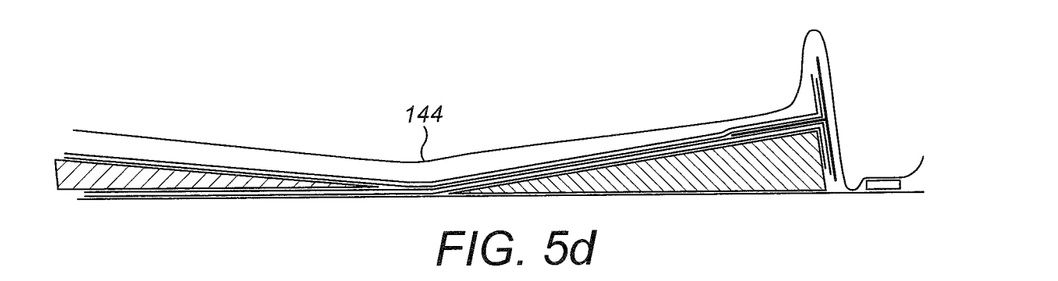

Referring now to FIG. 5d, once the layup has been assembled, it is covered with vacuum film 144 and subject to substantially the same process as described above with reference to the first embodiment in order to consolidate the layup and cure the resin.

Figure 6A:
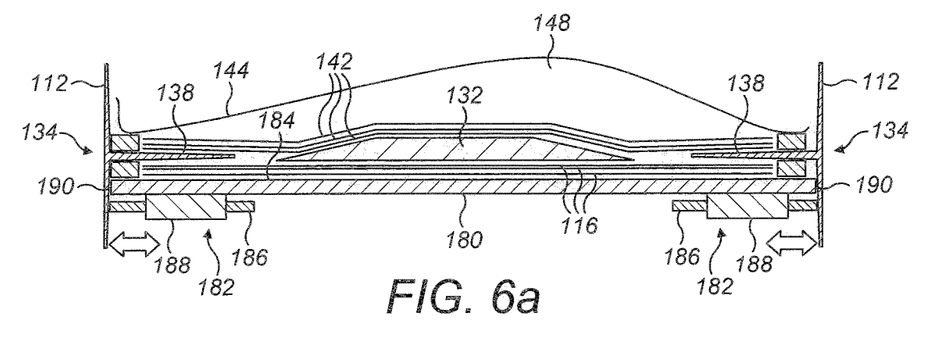
FIGS. 6a and 6b illustrate a shear web and its method of manufacture in accordance with a third example of the present invention.
Figure 6B:
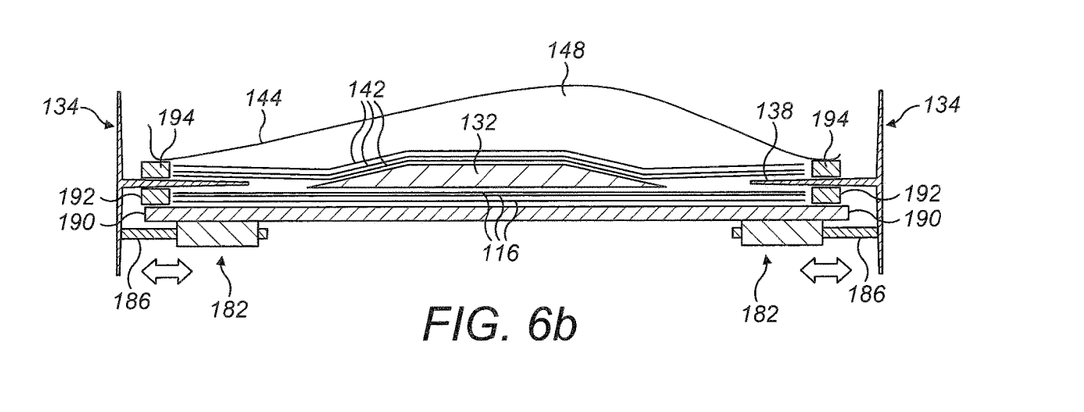

A further embodiment will now be described with reference to FIGS. 6a and 6b, which show a shear web layup supported on a steel mould tool 180 having adjustable depth stops 182 for setting the height of the shear web 106. In FIGS. 6a and 6b, flange structures 134 are shown at both edges of mould 180.

Referring to FIG. 6a, the mould tool 180 extends longitudinally perpendicular to the plane of the page. The section of the mould tool 180 shown in FIG. 6a comprises a flat, horizontal mould surface 184 without sidewalls. However, if required, other sections of the mould tool 180 may have a kinked surface similar to the first embodiment, or a wedge may be provided on the mould surface 184 to form a kinked surface similar to the second embodiment.

The method of making the shear web 106 using the mould tool 180 shown in FIG. 6a is similar to the methods previously described in that it involves arranging a plurality of first prepreg layers 116 on the mould surface 184; the core material 132 and projecting portions 138 of the flange structures 134 are then arranged on top and covered by a plurality of second fibrous layers 142. The layup is then covered with vacuum film 144 and subject to a vacuum consolidation and cure process, as described previously, to integrate the layers together.

As mentioned above, the depth stops 182 are used to set the height of the shear web 106. The depth stops 182 each comprise a threaded shaft 186 which is turnable within a nut 188 mounted near a longitudinal edge 190 of the mould surface 182. The shafts 186 project outwardly past the longitudinal edges 190 of the mould surface 184. The flange structures 134 are arranged alongside the longitudinal edges 190 of the mould surface 184 such that the flange portions 112 abut the threaded shafts 186 of the depth stops 182. The depth stops 182 control the separation between the flanges 112 and the edges 190 of the mould surface 184, and hence control the extent to which the projecting portions 138 of the flange structures 134 extend between the first and second laminate layers 116, 142.

Referring now to FIG. 6b, this shows the threaded shafts 186 of the depth stops 182 extended further than the shafts 186 in FIG. 6a, such that the projecting portions 138 of the flange structures 134 extend between the first and second laminate layers 116, 142 to a lesser extent than that shown in FIG. 6a. Accordingly, in FIG. 6b the flanges 112 are displaced further from the longitudinal edges 190 of the laminate layers 116, 142 than in FIG. 6a. The mould tool 180 in FIG. 6b is thus arranged to form a shear web 106 of greater height than the mould tool 180 in FIG. 6a.

In this example, in order to form a sealed region 148 for the vacuum consolidation process, first seals 192 are provided between the projecting portions 138 of the flange structures 134 and the mould surface 184, and second seals 194 are provided between the projecting portions 138 of the flange structures 134 and the vacuum film 144. Other suitable arrangements of the vacuum film 144 and seals 192, 194 will be readily apparent to persons skilled in the art. For example, the vacuum film 144 may completely cover the flange structures 134, such as in the previous embodiments and be sealed against a suitable surface, for example against an extension of the mould tool.

Whilst some of the embodiments described above utilise a kinked web 106 to accommodate curved or otherwise inclined portions of the blade shell 102, in some cases it is desirable to have a straight web without kinks. However, the use of a straight web with flange structures 134 as shown in the previous embodiments can present certain difficulties, as will now be explained with reference to FIGS. 7a and 7b.

Figure 7A:
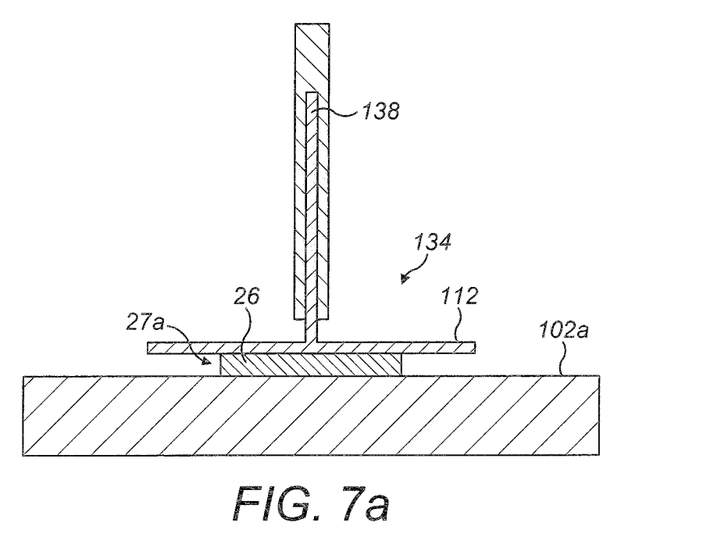
FIG. 7a is a schematic cross-sectional view illustrating a shear web having a T-shaped flange structure bonded to a flat portion of a wind turbine blade shell.
Figure 7B:
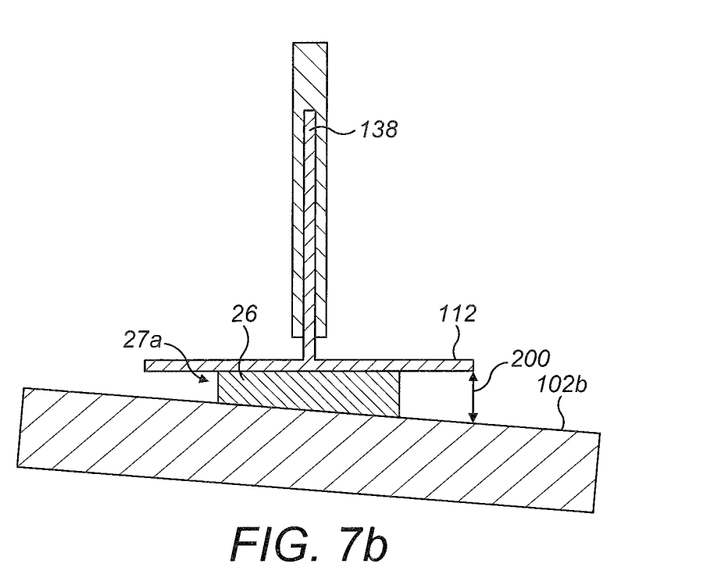
FIG. 7b illustrates a shear web having a T-shaped flange structure bonded to an inclined portion of a wind turbine blade shell.

Referring to FIG. 7a, this shows a T-shaped flange structure 134 identical to the flange structures 134 described above, in which the projecting portion 138 ('upstand') projects perpendicularly from the flange 112. It can be seen in FIG. 7a that the flange 112 fits well against a flat shell portion 102a of the wind turbine blade and allows for a uniform and optimal thickness of adhesive 26 in the bond line 27a between the shell 102a and the flange 112. However, referring to FIG. 7b, in the case of an inclined portion 102b of the shell, there is an increased gap 200 between the flange 112 and the shell 102b at least along one edge of the flange 112. This results in excessive adhesive 26 being required in the bond line 27a to fill this gap 200, which may add considerable weight and cost to the blade.

Figure 8A:
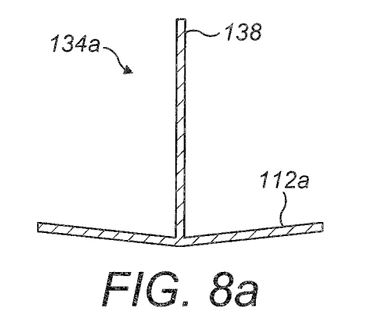
FIG. 8a shows a flange structure having a V-shaped flange.
Figure 8B:
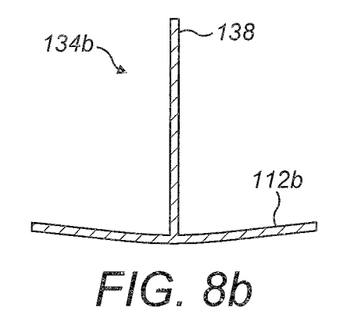
FIG. 8b shows a flange structure having a curved flange.

In order to address this problem, modified flange structures 134a, 134b were developed as shown in FIGS. 8a and 8b, which are still substantially T-shaped, but in which the flange 112a, 112b is transverse but not perpendicular to the upstand 138. For example, referring to FIG. 8a, the flange structure 134a has a V-shaped flange 112a, whilst in FIG. 8b the flange 112b is curved.

Figure 9A:
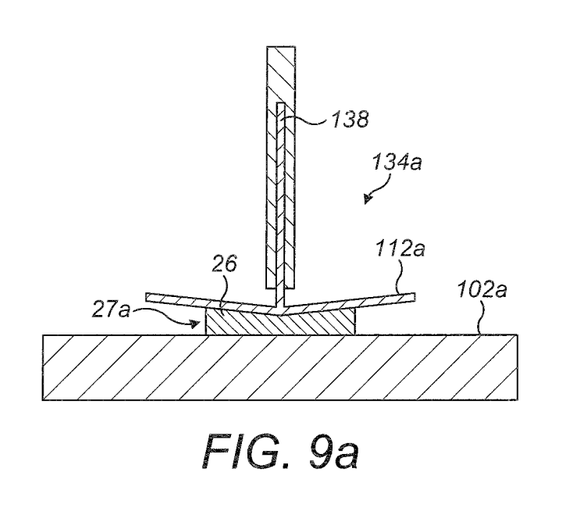
FIG. 9a illustrates the flange structure of FIG. 8a bonded to a flat portion of a wind turbine blade shell.
Figure 9B:
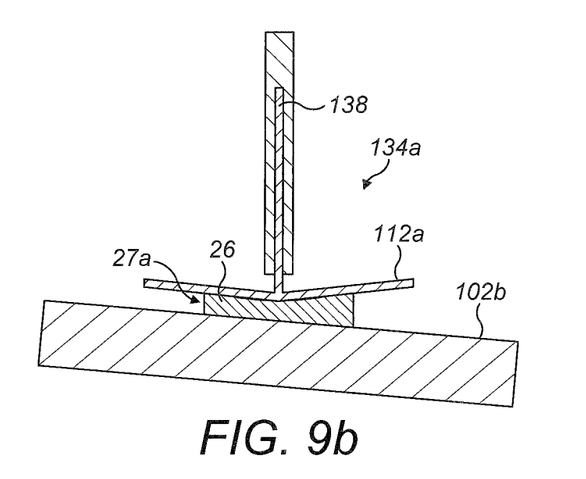
FIG. 9b illustrates the flange structure of FIG. 8a bonded to an inclined portion of a wind turbine blade shell.

FIGS. 9a and 9b respectively illustrate that the flange structure 134a of FIG. 8a fits well against both flat and angled shell portions 102a, 102b without requiring excessive adhesive 26 in the bond line 27a even in the case of angled shell portions 102b as shown in FIG. 9b. Whilst not illustrated, an equivalent effect is achieved for the flange structure 134b shown in FIG. 8b, which has a curved flange 112b.

Whilst the modified flange structures 134a, 134b shown in FIGS. 8a and 8b accommodate both flat and inclined portions 102a, 102b of the shell without requiring excessive adhesive 26 in the bond lines 27a, they present certain difficulties in the web manufacturing process, as discussed below with reference to FIGS. 10a and 10b.

Figure 10A:
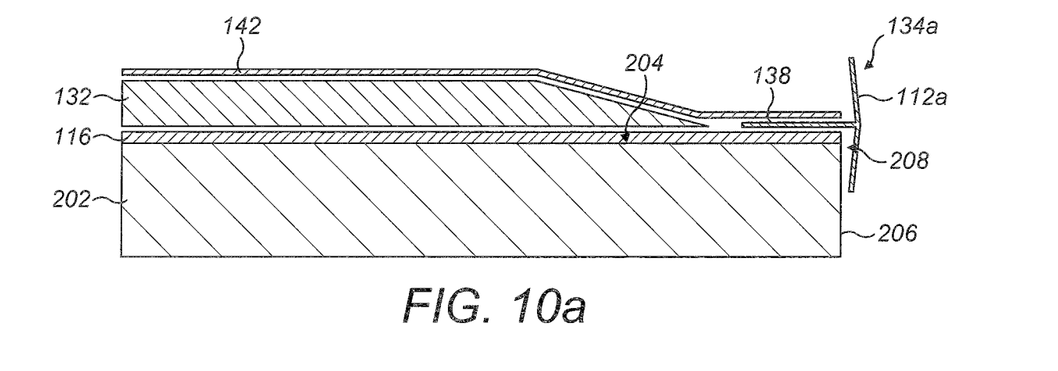
FIG. 10a illustrates the flange structure of FIG. 8b arranged in a mould to form a shear web.
Figure 10B:
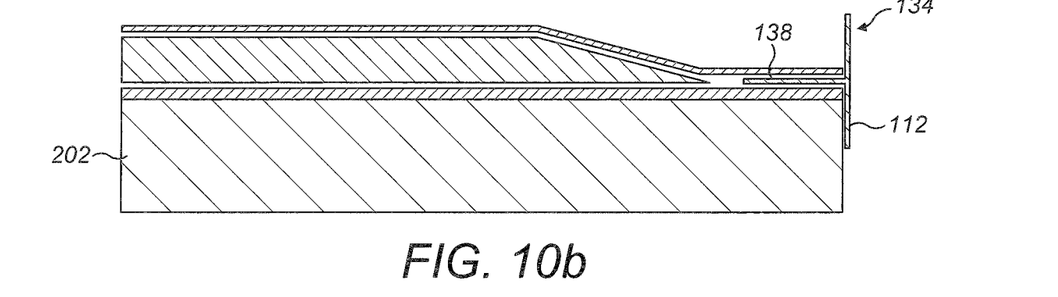
FIG. 10b illustrates the flange structure of FIGS. 7a and 7b arranged in a mould to form a shear web.

Referring to FIG. 10a, this shows the flange structure 134a of FIG. 8a laid up with the various layers 116, 132, 142 (as described previously) forming the shear web panel on a mould tool 202 having a flat mould surface 204. As the flange 112a is V-shaped and thus not perpendicular to the upstand 138, it can be seen that the flange 112a does not sit flush against the shoulder 206 of the mould tool 202. A gap 208 is therefore created between the mould tool 202 and the flange 112a. During a subsequent vacuum bagging and moulding step (as described previously), this gap 208 may fill with resin, which is undesirable. This arrangement can be contrasted with the situation shown in FIG. 10b, where the flange 112 of the flange structure 134 is perpendicular to the upstand 138. This results in the flange 112 sitting flush against the mould tool 202 and avoids the possibility of an undesirable resin-rich gap, but as discussed previously with reference to FIG. 7b, the flange structure 134 shown in FIG. 10b does not fit optimally against an inclined shell surface 102b.

Figure 11A:
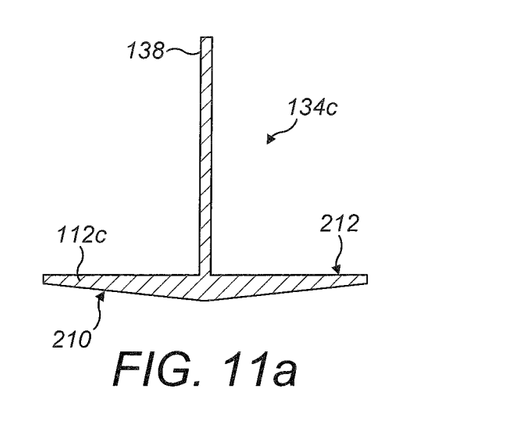
FIG. 11a shows a flange structure having a pyramid-shaped flange.
Figure 11B:
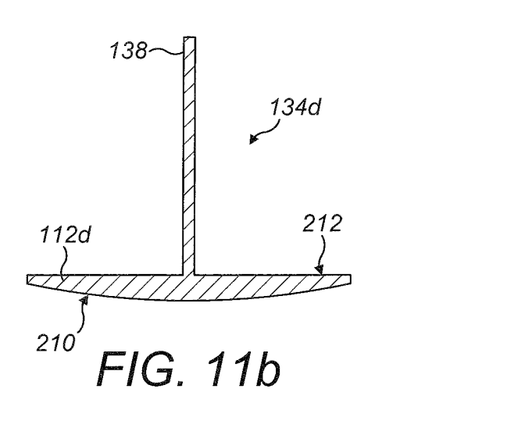
FIG. 11b shows a flange structure having a dome-shaped flange.

In order to address these manufacturing difficulties, further variants of the flange structure 134c, 134d have been developed as illustrated in FIGS. 11a and 11b. The flange structure 134c shown in FIG. 11a has a 'pyramid'-shaped flange 112c, in which an outer surface 210 of the flange 112c is V-shaped, whilst an inner surface 212 of the flange 112c is flat. The flange structure 134d shown in FIG. 11b has a 'dome'-shaped flange 112d, in which the outer surface 210 of the flange is curved, whilst the inner surface 212 is flat. The terms 'inner' and 'outer' are used herein because, as will be appreciated, when the shear web is installed inside a wind turbine blade, the 'outer' surface 210 of the flange 112c, 112d faces the blade shell and makes contact with the adhesive, whilst the 'inner' surface 212 of the flange 112c, 112d faces towards the interior of the blade.

In both examples shown in FIGS. 11a and 11b, the upstand 138 of the flange structure 134c, 134d is perpendicular to the flat inner surface 212 of the flange 112c, 112d. Accordingly, an approximately 90-degree angle is formed between the upstand 138 and the flange 112c, 112d. This allows the flat upper surface 212 of the of the flange 112c, 112d to sit flush against the shoulder 206 of the mould tool 202 during manufacture of the shear web, similar to the situation shown in FIG. 10b above, and thus the risk of a resin-rich gap 208 (see FIG. 10a) between the flange 112c, 112d and the mould tool 202 is avoided. The outer surfaces 210 of the flanges 112c, 112d shown in FIGS. 11a and 11b correspond to the flanges 112a, 112b shown in FIGS. 8a and 8b and therefore are advantageously able to accommodate both flat and inclined shell surfaces in the same way as previously described.

In a further embodiment, the flange structure may be designed to accommodate varying curvatures or inclinations of the shell by incorporating a wedge-shaped flange, as discussed below with reference to FIGS. 12a-12c.

Figure 12A:
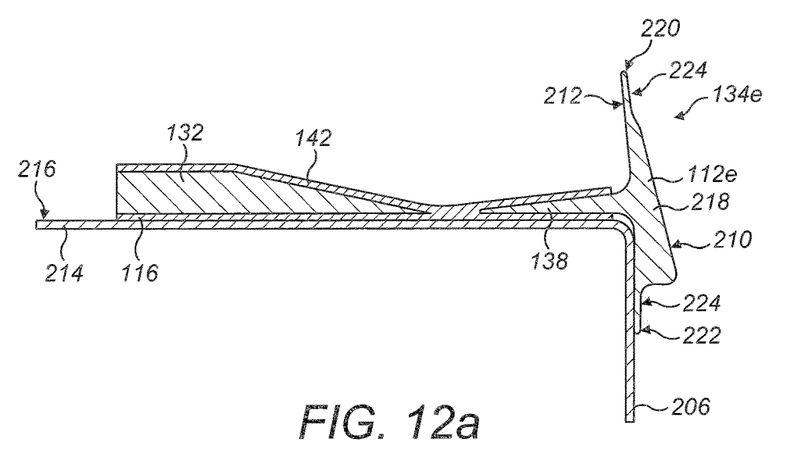
FIGS. 12a and 12b illustrate flange structures having wedge-shaped flanges arranged in a mould to form a shear web.

Referring to FIG. 12a, this shows a flange structure 134e having a wedge-shaped flange 112e laid up on a mould tool 214 together with the various layers 116, 132, 142 (as described previously) forming the web of a shear web. The mould tool 214 has a flat surface 216 and is therefore configured to form a substantially straight web in this example. The wedge-shaped flange 112e has a flat inner surface 212 from which an upstand 138 projects substantially perpendicularly, such that an angle of approximately 90 degrees is formed between the upstand 138 and the flat inner surface 212 of the flange 112e. Accordingly, the inner surface 212 of the flange 134e advantageously sits substantially flush against the shoulder 206 of the mould tool 214.

The flange 112e has a main central portion 218 located between first and second longitudinal edges 220, 222 of the flange 112e. The main central portion 218 generally increases in thickness moving transversely in a direction from the first edge 220 towards the second edge 222, such that the main central section 218 is wedge-shaped in cross section. The wedge-shaped flange 112e has an outer surface 210 that is inclined relative to the upstand 138, such that the outer surface 210 can fit well against an inclined surface of the blade shell.

Figure 12B:
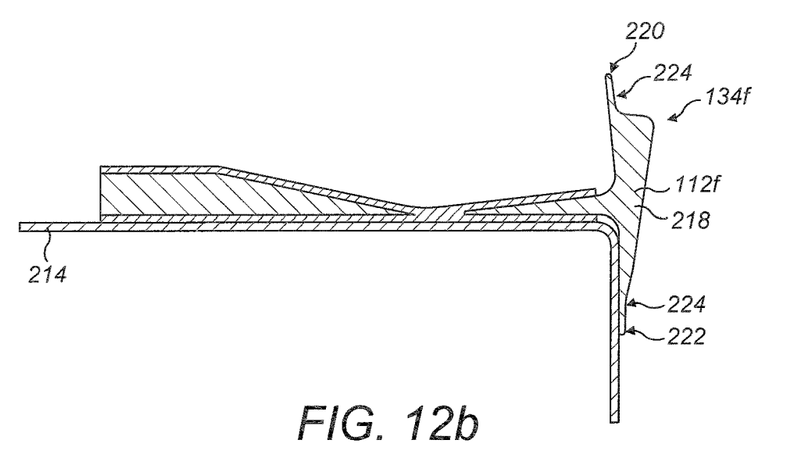

Referring now to FIG. 12b, this shows a flange structure 134f similar to the flange structure 134e described above with reference to FIG. 12a but in which the thickness of the main central portion 218 of the flange 112f decreases moving transversely in a direction from the first longitudinal edge 220 towards the second longitudinal edge 222 of the flange 112f. This shape allows the flange 112f to fit well against an inclined surface of the blade shell, which is inclined in an opposite sense to the surface for which the flange 112e shown in FIG. 12a is designed to fit against.

Figure 12C:
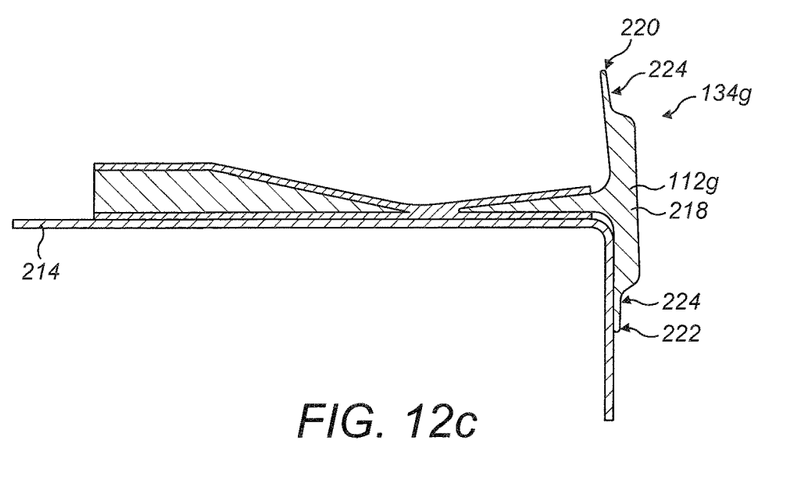
FIG. 12c illustrates a variant of the flange structures shown in FIGS. 12a and 12b.

FIG. 12c shows a further flange structure 134g, which is designed to fit against a flat (i.e. non inclined) shell portion of the wind turbine blade. In this example, the main central section 218 of the flange 112g is of substantially uniform thickness in a transverse direction. As the shell geometry varies along the length of a wind turbine blade, a shear web may have a flange structure such as the flange structure 134g shown in FIG. 12a along some sections of the web, and flange structures such as the flange structures 134e and 134f shown in FIG. 12a and/or FIG. 12b along other sections of the web.

In the embodiments shown in FIGS. 12a to 12c, the flange 112e, 112f, 112g of the flange structure 134e, 134f, 134g includes so-called 'glue-catcher' portions 224 along its respective longitudinal edges 220, 222. These glue-catcher portions 224 are in the form of 'wings', which are defined by edge regions of the flange having a reduced thickness in comparison to the thickness of the main central section 218. These 'wings' or 'glue catchers' 224 are provided to catch any excess adhesive that is squeezed out when the shear web is bonded to the blade shells. Without these features there is a risk that the excess adhesive may detach from the blade shell and cause a mess inside the blade. Whilst the glue catchers 224 are only shown in connection with this embodiment, it will be appreciated that they can be included in any of the flange structures described herein.

In each of the examples described above, the flange structures are formed by pultrusion. As already mentioned above, the pultrusion process may involve drawing unidirectional fibres through a pultrusion die having a shape corresponding to the cross-sectional shape of the flange structure, e.g. substantially T-shaped. In other embodiments, the pultrusion process may involve drawing fibre tape through the pultrusion die to form the flange structures. The fibre tape may include fibres (e.g. glass fibres) in any orientation. In preferred embodiments, biax tape is used, in which the fibres are arranged predominately in two directions which are, respectively, +/−45 degrees relative to the direction of pultrusion. In some embodiments a combination of unidirectional fibres and/or unidirectional tape may be drawn through the die in combination with biax tape or other such tape having fibres orientated transversely with respect to the longitudinal direction of the pultruded component.

Many modifications may be made to the above examples without departing from the scope of the present invention as defined in the accompanying claims. In particular, features described in relation to a particular embodiment may be readily applied to the other embodiments. Whilst prepreg materials have been described in relation to the above embodiments, in other examples dry fibrous fabric may be used instead or in addition. In such cases, resin may be admitted into the sealed region defined by the vacuum bag in an infusion process such as VARTM.

The invention claimed is:

1. A method of making an elongate reinforcing structure for a wind turbine blade, the reinforcing structure comprising a longitudinally-extending web and a longitudinally-extending flange, the flange extending along a longitudinal edge of the web and being arranged transversely to the web, and the method comprising:
    providing a longitudinally-extending mould tool having a mould surface bound by a first longitudinal edge of the mould tool, the mould surface being shaped to define the web of the reinforcing structure;
    providing a pultruded flange structure comprising a flange portion and a projecting portion that extends along the length of the flange portion and projects transversely from a surface of the flange portion;
    supporting one or more first laminate layers of the web on the mould surface;
    positioning the flange structure adjacent to the first longitudinal edge of the mould tool such that the projecting portion of the flange structure overlies a first longitudinal edge region of the one or more laminate layers and such that the flange portion is transverse to the mould surface;
    after positioning the flange structure, arranging one or more second laminate layers on top of the one or more first laminate layers such that the one or more second laminate layers at least partially cover the projecting portion of the flange structure; and
    integrating the one or more first laminate layers, the one or more second laminate layers and the projecting portion of the flange structure in the mould tool by means of a matrix material and thereby bonding the projecting portion between the one or more first laminate layers and the one or more second laminate layers.

2. The method of claim 1, wherein the flange structure has a substantially constant cross section along its length.

3. The method of claim 1, wherein the flange structure is substantially T-shaped or L-shaped in cross-section.

4. The method of claim 1, wherein the flange portion is in the form of a substantially flat strip.

5. The method of claim 1, wherein the flange portion is wedge-shaped.

6. The method of claim 1, wherein the flange portion has a substantially V-shaped or curved outer surface.

7. The method of claim 1, wherein the projecting portion forms an angle of approximately 90 degrees with an inner surface of the flange portion.

8. The method of claim 1, wherein the flange portion has a substantially flat inner surface from which the projecting portion projects.

9. The method of claim 1, wherein the method further comprises:
    arranging a packing element adjacent to the first longitudinal edge of the mould tool, between the mould tool and the flange portion of the flange structure, the packing element having an upper surface defining an extension of the mould surface;
    arranging the one or more first laminate layers, the projecting portion of the flange structure and the one or more second laminate layers such that they at least partially overlie the upper surface of the packing element; and
    selecting the dimensions of the packing element according to a required height of the reinforcing structure in a direction transverse to a direction of longitudinal extension of the reinforcing structure.

10. The method of claim 1, wherein the mould tool comprises a depth stop provided at the first longitudinal edge of the mould tool, the depth stop being arranged to extend beyond the mould surface and abut the flange portion of the flange structure to set the extent to which the projecting portion of the flange structure extends between the one or more first laminate layers and the one or more second laminate layers, and thereby to set the height of the reinforcing structure in a direction transverse to a direction of longitudinal extension of the reinforcing structure.

11. The method of claim 10, wherein the depth stop is adjustable and the method comprises varying the extent to which the depth stop extend beyond the mould surface thereby to select a required height of the reinforcing structure in a direction transverse to a direction of longitudinal extension of the reinforcing structure.

12. The method of claim 1, wherein the mould surface is substantially flat.

13. The method of claim 1, wherein the mould surface comprises a kink resulting in the web portion of the reinforcing structure having a kink.

14. The method of claim 1, wherein the method comprises positioning a wedge-shaped element on the mould surface to form a kink and arranging the one or more first laminate layers over the wedge-shaped element.

15. The method of claim 1, wherein the one or more first laminate layers and/or the one or more second laminate layers comprise fibrous material.

16. The method of claim 1, wherein the method further comprises arranging core material between the one or more first laminate layers and the one or more second laminate layers.

17. The method of claim 1, wherein the matrix material is resin.

18. The method of claim 1, wherein the method further comprises:
    arranging a vacuum film over the mould tool to form a sealed region encapsulating the laminate layers and the projecting portion of the flange structure;
    evacuating the sealed region;
    optionally admitting matrix material into the sealed region; and
    applying heat to cure the matrix material.

19. The method of claim 18, wherein the method comprises arranging the vacuum film over the flange portions of the reinforcing flange structures such that substantially the entire flange structure is encapsulated within the sealed region.

20. The method of claim 1, wherein the method further comprises providing a further flange structure comprising a flange portion and a projecting portion that extends along the length of the flange portion and projects transversely from a surface of the flange portion;

positioning the further flange structure adjacent to a second longitudinal edge of the mould tool such that the projecting portion of the further flange structure overlies a second longitudinal edge region of the one or more first laminate layers and such that the flange portion is transverse to the mould surface;

arranging the one or more second laminate layers on top of the one or more first laminate layers such that the one or more second laminate layers additionally at least partially cover the projecting portion of the further flange structure; and bonding the projecting portion of the further flange structure between the one or more first laminate layers and the one or more second laminate layers.

21. The method of claim 20, wherein the respective flange structures are substantially identical.

\* \* \* \* \*